(12) United States Patent
Wu et al.

(10) Patent No.: US 10,802,301 B2
(45) Date of Patent: Oct. 13, 2020

(54) ACTIVE METASURFACES FOR DYNAMIC POLARIZATION CONVERSION

(71) Applicant: CALIFORNIA INSTITUTE OF TECHNOLOGY, Pasadena, CA (US)

(72) Inventors: Pin Chieh Wu, Pasadena, CA (US); Ruzan Sokhoyan, Pasadena, CA (US); Ghazaleh Kafaie Shirmanesh, Pasadena, CA (US); Harry A. Atwater, South Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 142 days.

(21) Appl. No.: 16/124,948

(22) Filed: Sep. 7, 2018

(65) Prior Publication Data

US 2019/0079321 A1    Mar. 14, 2019

Related U.S. Application Data

(60) Provisional application No. 62/555,839, filed on Sep. 8, 2017.

(51) Int. Cl.
*G02F 1/01* (2006.01)
*G02F 1/055* (2006.01)

(52) U.S. Cl.
CPC .......... *G02F 1/0136* (2013.01); *G02F 1/0147* (2013.01); *G02F 1/0551* (2013.01); *G02F 1/0555* (2013.01); *G02F 2202/101* (2013.01); *G02F 2202/102* (2013.01); *G02F 2202/30* (2013.01)

(58) Field of Classification Search
CPC ........ G02F 1/167; G02F 1/055; G02F 1/0136; B82Y 20/00; B32B 17/10
USPC .......................................................... 359/252
See application file for complete search history.

(56) References Cited

U.S. PATENT DOCUMENTS

2017/0023803 A1*    1/2017  Han ....................... G02F 1/0102
2018/0046056 A1*    2/2018  Na ......................... G02F 1/0147

OTHER PUBLICATIONS

Arbabi, E., et al. "MEMS-tunable dielectric metasurface lens",*Nature Communications*9, 812, (Feb. 2018). 9 pages.
Lee, H.W., et al. "Nanoscale Conducting Oxide PlasMOStor",*Nano Letters*14, 6463-6468, (Oct. 2014). 6 pages.
Saenrang, W., et al. "Deterministic and robus room-temperature exchange coupling in monodomain multiferroic BiFeO3 heterostructures", *Nature Communications*8, 1583, (Nov. 2017). 8 pages.
She, A., et al. "Adaptive metalenses with simultaneous electrical control of focal length, astigmatism, and shift",*Science Advances*4, eaap9957, (Feb. 2018). 8 pages.

* cited by examiner

*Primary Examiner* — Mohammed A Hasan
(74) *Attorney, Agent, or Firm* — Steinfl + Bruno LLP

(57) ABSTRACT

The optical response of a metasurface is controlled by actuating it via an electrical or magnetic field, temperature control, optical pumping or electromechanical actuation. The metasurface will therefore control the polarization of the incident light. The metasurface comprises an array of patch antennas. The patch antennas are in the form of asymmetrical elements, including rotated rods, cross-shapes, V-shapes, and L-shapes.

19 Claims, 6 Drawing Sheets

ACTIVE METASURFACES FOR DYNAMIC POLARIZATION CONVERSION

CROSS REFERENCE TO RELATED APPLICATIONS

The present application claims priority to US Provisional Patent Application No. 62/555,839, filed on Sep. 8, 2017, the disclosure of which is incorporated herein by reference in its entirety.

TECHNICAL FIELD

The present disclosure relates to optical devices. More particularly, it relates to active metasurfaces for dynamic polarization conversion.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

In a first aspect of the disclosure, a structure is described, the structure comprising: a first electrode transparent to incident electromagnetic radiation; a second electrode; a dielectric layer, having a first refractive index, between the first electrode and the second electrode; and an array of elements on a surface of the first electrode opposite to the dielectric layer, wherein upon application of a control signal, the dielectric layer is configured to change its refractive index have at least one first layer having a refractive index higher than at least one second layer.

DETAILED DESCRIPTION

The present disclosure discloses actively tunable metasurface. The metasurfaces described herein are tunable because the coupling between different eigenmodes supported by a metasurface can be actively controlled. By varying the coupling between the eigenmodes, the metasurfaces can, in turn, control the amplitude, phase and polarization of light, both in reflection or transmission mode. In some embodiments, a metasurface may simultaneously modulate both reflected and transmitted light. An example of a metasurface that enables tunable coupling between different modes is shown in FIG. 1.

Figure 1:
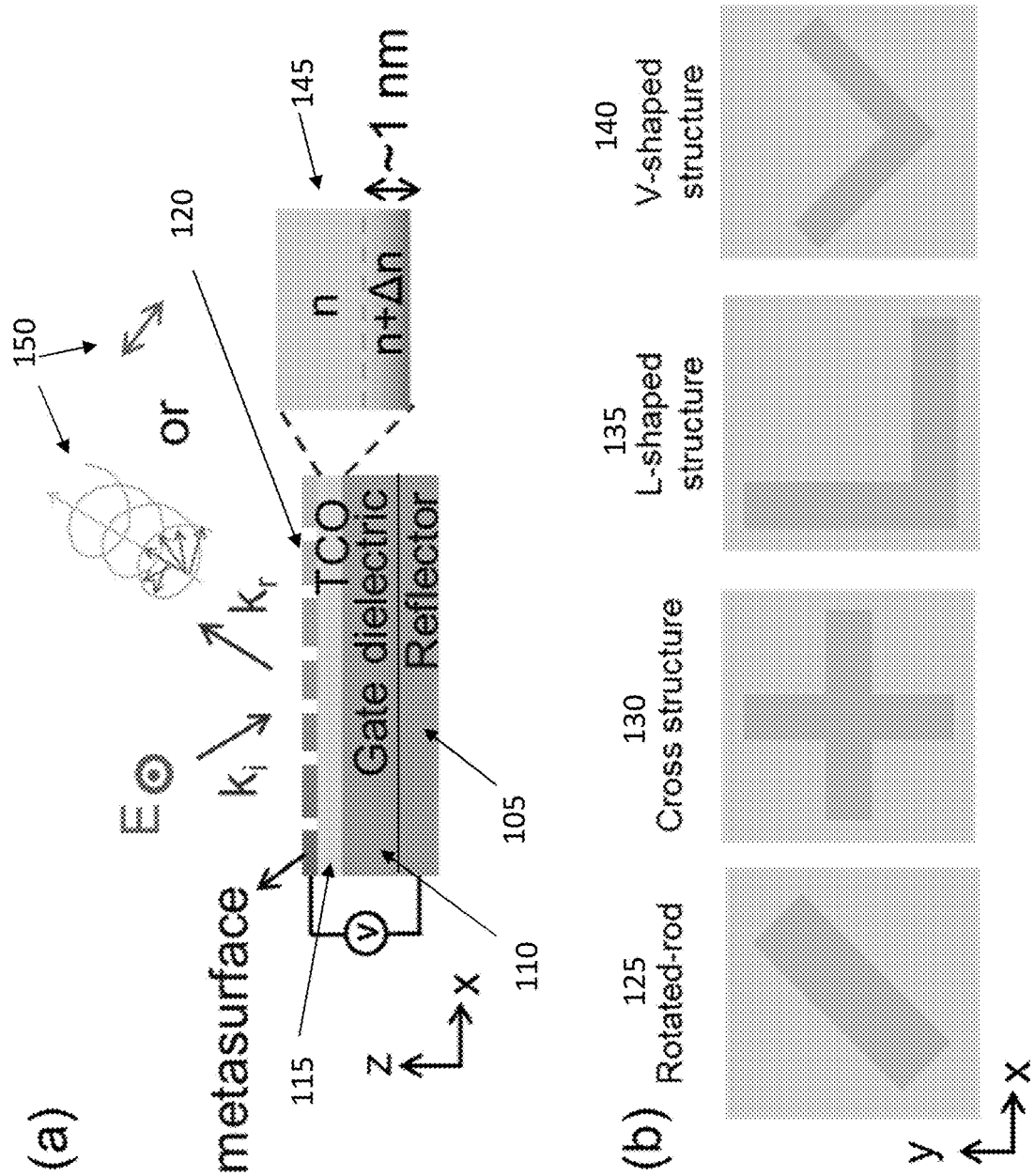
FIG. 1 illustrates how linearly polarized incident radiation can be actively changed to a circularly polarized light, elliptically-polarized light, or its orthogonal state, via electrical control of the metasurface.

In some embodiments, it is possible to fabricate reflectarray metasurfaces with patch antennas having different patch geometries, as illustrated in FIG. 1 panel b. Tunability can be obtained by integrating an index change material into the metasurface structure, and/or by depositing the index change material on top of the metasurface. In some embodiments, multiple optical modes are excited at the same time when light is incident on a metasurface.

FIG. 1, panel a, illustrates an exemplary metasurface comprising a reflector (105), which reflects light incident from a top surface of the metasurface, a gate dielectric (110), a transparent conductive oxide (e.g. TCO, 115), and an array of elements (120). FIG. 1, panel b, illustrates exemplary elements that can be included in the array, such as rotated rods (125), crosses (130), L shapes (135), and V shapes (140). Other shapes may also be used. In this example, panel a is a side view while panel b is a top view of a single element of the array. FIG. 1 illustrates how the metasurface, for example the TCO layer (115), may comprise two regions each with a different refractive index (145). These two regions can be the same material with a refractive index that is modulated due to the application of a control signal, such as the voltage of FIG. 1. In this example, the layer with a higher refractive index has a thickness of 1 nm, or about 1 nm. The entire layer (145) is made of a TCO, however the bottom part of the TCO layer has a different refractive index due to the applied voltage. FIG. 1 also illustrates circular polarization or linear polarization for the reflected radiation (150), which the metasurface can control as described in the present disclosure.

The metasurface structure may be asymmetric with respect to the direction of the incident electric field of the electromagnetic radiation. For example, FIG. 1 illustrates a rotated rode element (125) which is asymmetric with respect to the direction of the y- or x-polarized electric field. The structural configuration of the metasurface also enables tuning of the coupling between different eigenmodes at specific wavelengths, subsequently changing the polarization state of the scattered light. Therefore, the metasurface structure shown in FIG. 1 can be regarded as a dynamic polarization converter that is able to change the polarization states of scattered light via electrical control. For example, incident light may be linearly polarized, circularly polarized, elliptically polarized, radially polarized, etc. The device can control the polarization state of the reflected light, based on an electrical voltage applied to the metasurface, as illustrated in FIG. 1.

In some embodiments, the metasurface may have a back reflector. The metasurface antennas can be made of materials which behave like metals with regard to their optical properties, while in other embodiments the materials chosen may behave like dielectrics. For example, materials that have a metallic optical response comprise gold, silver, aluminum, copper, chromium, and some semiconductors, while materials that have a dielectric optical response comprise silicon, titanium oxide, gallium nitride, gallium arsenide, gallium phosphide, silica, hafnia, transparent conducting oxides, and others. A metallic optical response implies that the real part of the refractive index of the material is a negative number, while a dielectric optical response implies that the real part of the refractive index is a positive number.

Tunability of the metasurface can be achieved by integrating a refractive index change material into a metasurface or placing such material in the vicinity of the metasurface. The index change material can be, for example, a semiconductor, such as Si, III-V materials (e.g. GaAs, InP, GaP), transparent conducting oxides (ITO, AZO, GZO, etc.), transition metal nitrides (TiN, ZrN, HfN, TaN), or two dimensional materials ($MoS_2$, $WSe_2$, black phosphorus, etc.). It is also possible to incorporate in the metasurface semiconductors with different carrier densities (for example, ITO with two different carrier concentrations). Therefore, the same material, having different carrier densities, may exhibit different refractive indexes. By index change material, the present disclosure refers to a material whose refractive index can be actively changed by external stimuli, such as the application of an electric field, temperature, etc. The schematic shown in FIG. 1 illustrates an example where the refractive index of the TCO layer presents two regions with different indexes, due to the applied voltage. In this example, the bottom region, having a thickness of about 1 nm, has a refractive index modulated by Δn with respect to the standard refractive index n of TCO. An electric bias is applied across the TCO layer. In other embodiments, a different control signal may be applied, such as a temperature gradient instead of an electric bias.

The optical tunability may originate by forming a nanoscale capacitor with gate dielectrics such as $Al_2O_3$, $MgF_2$, $HfO_2$, MgO and $SiO_2$, or nanolaminates such as HAOL. It is possible to use a nanolaminate as a gate dielectric. A nanolaminate comprises alternating layers of different materials. For example, HAOL comprises alternate layers of $HfO_2$ and $Al_2O_3$. HAOL is an acronym for Hf and Al oxide layers. The index change in such active index materials can be obtained by a voltage bias applied with respect to the other materials. With reference to the example of FIG. 1, when applying a voltage bias to the TCO layer with respect to the back reflector, either positive or negative charges will accumulate at the interface between TCO and the gate dielectric, resulting in a change of the refractive index of TCO. For a constant electric bias, the higher the direct current (DC) permittivity of the gate dielectric is, the more free carriers will be accumulated at the interface. In turn, this will induce a higher change in the refractive index of the TCO layer. A similar process will occur if other materials are used instead of TCO. The layers can therefore be described as forming a nanoscale capacitor, with one electrode as TCO, one electrode as the reflector, and the dielectric in the middle as the gate dielectric.

Alternative methods to attain tunability of the metasurface can be based on the following mechanisms. The reorientation of liquid crystal molecules, via heating or by applying an electrical bias, can control the effective refractive index of the composite material by having a different optical response depending on the incident polarization. In other words, the reorientation of the liquid crystals can control the refractive index. Phase change materials such as $VO_2$ and GeSbTe (GST), can change their state by heating. When the phase state of a phase change material is changed, the refractive index is also changed due to the rearrangement of the crystal. Pockels effect and any other kind of electro-optic modulation can also control the refractive index through the application of an electrical bias. The Pockels electro-optic effect produces birefringence in an optical medium, by the application of an electric field. In the Pockels effect, also known as the linear electro-optic effect, the birefringence is proportional to the electric field. In the Kerr effect, the refractive index change (birefringence) is proportional to the square of the field. The transport of ions or vacancies via the application of an electrical bias can also control the refractive index. For example, since the free carriers affect the refractive index of a material, by injecting a current into a material, its refractive index can be changed.

Figure 3:
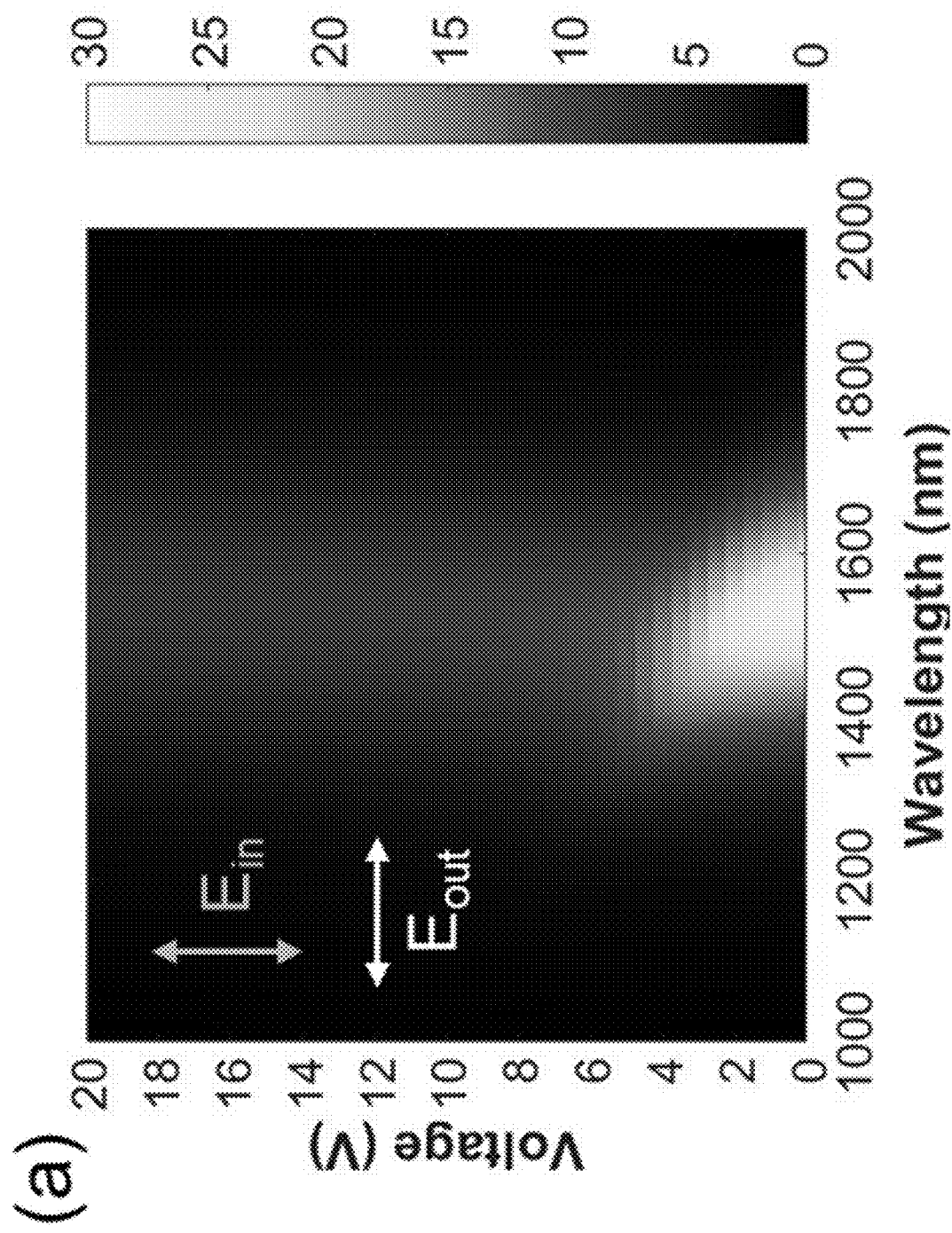
FIGS. 3-4 illustrate eigenmodes of a metasurface.
Figure 4:
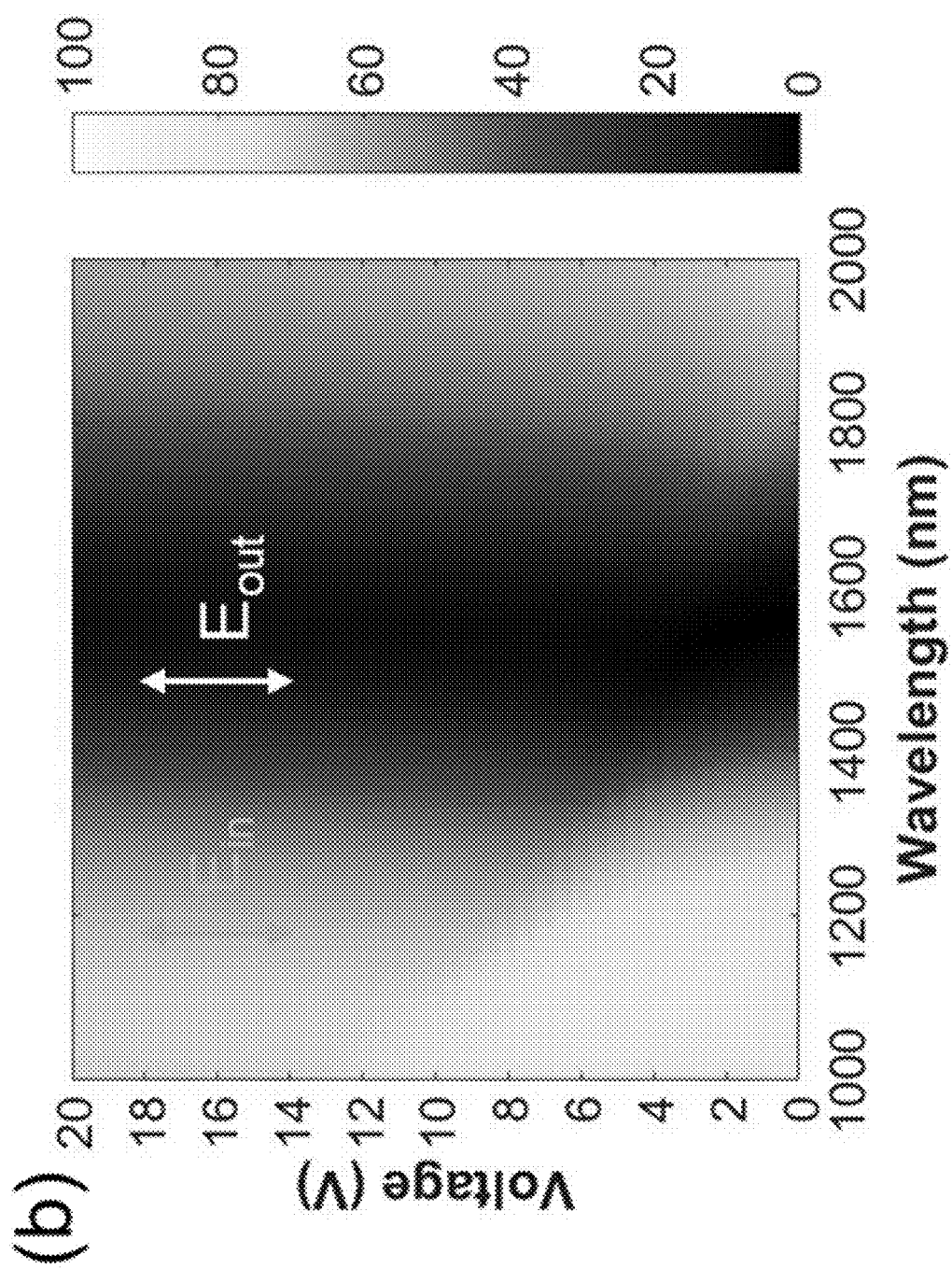

As described above, the tunable coupling between different eigenmodes can be used for phase or amplitude modulation by the metasurface. The eigenmodes can be electric or magnetic fundamental modes, or higher order modes. In some embodiments, a metallic mirror underneath the metasurface, acting as a reflector, can be introduced for: i) blocking light transmission for enhancing the efficiency of reflection; ii) increasing the interaction cross-section in near-field to effectively tune the optical path for phase modulation. In some embodiments, a structure anisotropic with respect to the incident electric field can be used for exciting different eigenmodes. An example of such anisotropic structures comprises rotated rod antennas, which exhibit symmetric and antisymmetric modes when the incident electric field is aligned to the symmetry axis of the structures. A rotated rod antenna can also be used for inducing some eigenmodes. The coupling between these excited eigenmodes can be actively tuned by changing the effective refractive index of the active layer between the structures and the metallic reflector. FIGS. 3-4 illustrate results for the tunable interaction between different resonant eigenmodes. The mappings in FIGS. 3-4 indicate the reflectance of x- and y-components of the scattered light. In this example, the incoming light is y-polarized, while the reflected light has an electric field with both x and y components. The plasma frequency in the accumulation layer increases with increased electrical bias. The plasma frequency of the carriers in the accumulation layer at the interface of the TCO layer directly controls the refractive index of the TCO. The refractive index of TCO, in this example, is proportional to the carrier density. When a TCO is used as one of the electrodes of the capacitor in FIG. 1, the carrier density will be higher if a higher bias is applied.

Figure 2:
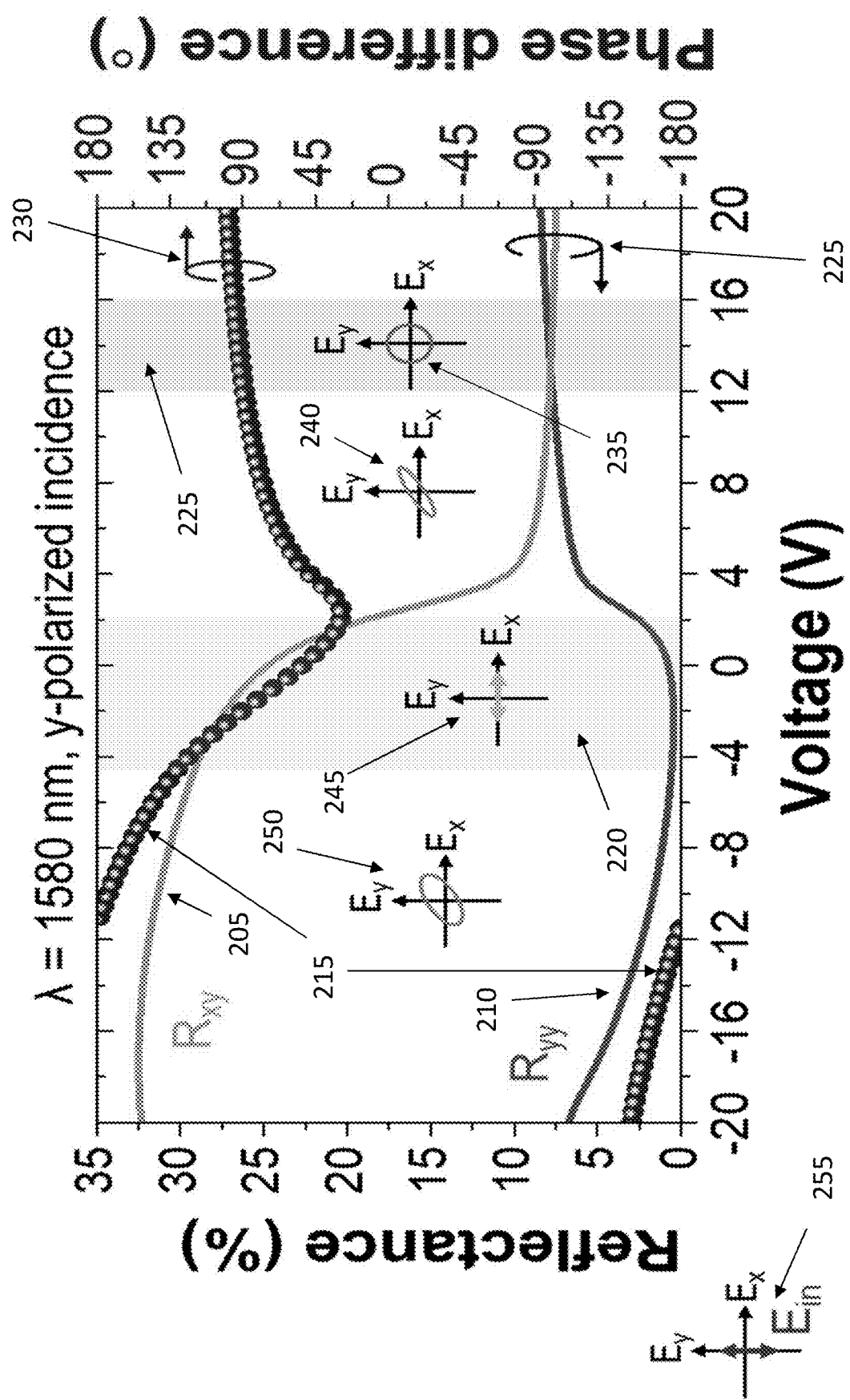
FIG. 2 illustrates reflectance and phase data of a metasurface.

FIG. 2 illustrates the x and y components of the reflectance, as well as the phase difference, for a metasurface. In the example of FIG. 2, the incident light is linearly polarized in the y direction (255). The data in FIG. 2 plots results for the dynamic polarization converter in the near infrared wavelength range. The polarization state of scattered light is actively changed by changing the plasma frequency of the accumulation layer in the TCO layer. For example, three polarization states can be actively achieved by applying a voltage: linear-to-linear, linear-to-circular, and linear-to-elliptical. In other words, the linearly polarized incident radiation is converted to linearly polarized radiation, with a different linear polarization. For example, this linear-to-linear conversion can be termed cross polarization conversion, and have 40% efficiency. In some embodiments, the linear-to-circular conversion can have 10% efficiency. Other efficiencies values may be obtained depending on the device implementation. The type of conversion can be controlled by the voltage bias applied to the metasurface device.

Figure 5:
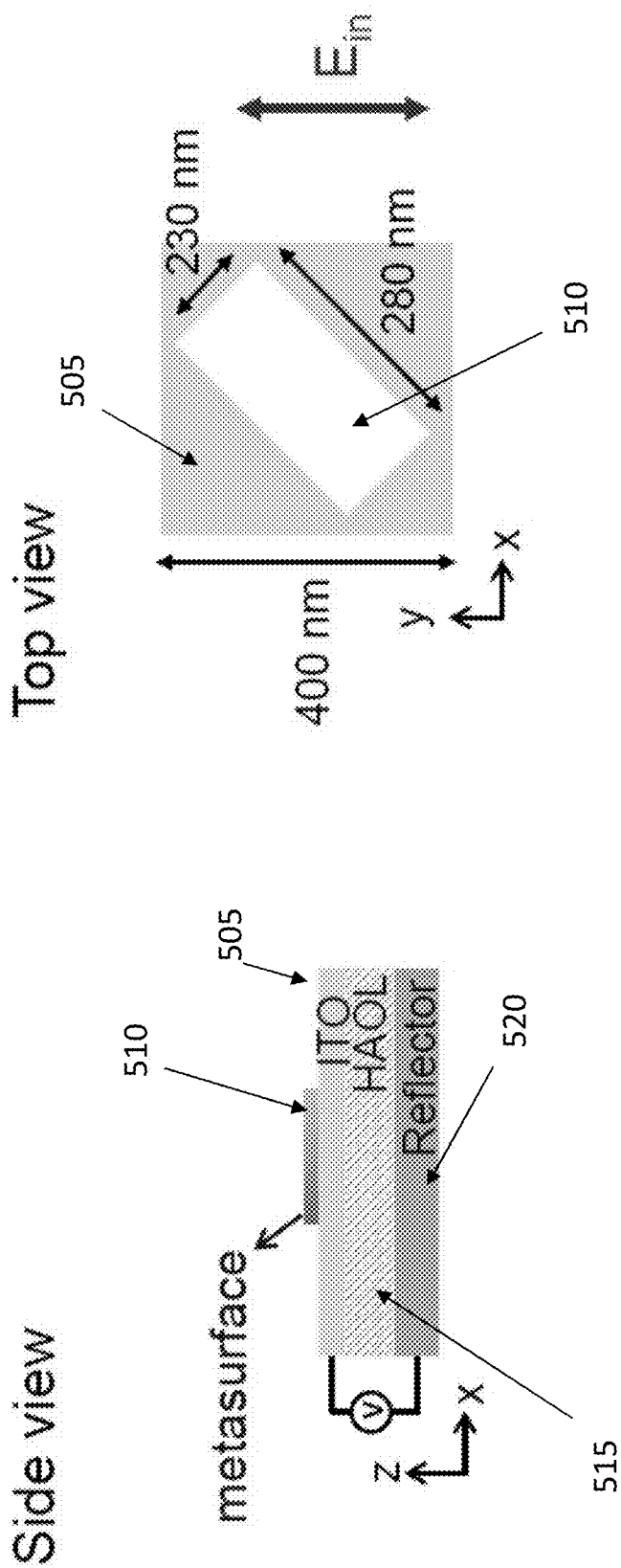
FIG. 5 illustrates an exemplary patch antenna.

FIG. 2 plots the reflectance and mutual phase shift of the x polarized component (205) and y polarized component (210) of the reflected light, as a function of voltage, for a wavelength of λ=1580 nm. In the example of FIG. 2, the incident light is linearly polarized in the y direction (255). Dots (215) show the phase difference between x- and y-polarized components of reflected light. When the applied bias is varied between −4 V and 2 V, a range highlighted in the shaded area (220), a y-to-x polarization conversion is realized, because the intensity of the y-polarized light is negligible in this voltage range. Therefore, the reflected light is linearly polarized in the x direction (245). When the applied bias is below −4 V, outside area (220), the reflected light is elliptically polarized (250). As the voltage increases from 2 V to ~12 V, the metasurface generates a linear-to-elliptical polarization conversion. The reflected light is elliptically polarized (240). For bias voltages above 12 V, the metasurface converts the incoming linearly polarized light into a circularly polarized light (235). A left circular polarization can be realized when the voltage is between 12 V and 16 V, shaded area (225), because the 90° phase difference between x- and y-components, and their equal reflectance. In FIG. 2, both (250) and (240) indicate elliptical polarization states. However, the amplitude difference between the x- and y-components is different for (250) compared to (240). This difference is indicated in FIG. 2 by using different widths for the ellipsis, rendering (240) more oblate. Therefore, in some embodiments, the metasurface can control, through the voltage or other control signals, the relative amplitude of the two polarization components (x and y) to control how oblate the elliptical polarization state is. In FIG. 5, (230) indicates that curve (215) refers to phase difference axis, while (225) refers to the range of voltages (225), between 12 V and 16 V.

FIG. 5 illustrates a side view and a top view of an exemplary rotated rod element that can be used to form a metasurface. In this example, the patch antenna has a square footprint (505) with an edge of 400 nm, while the rod element (510) has a width of 230 nm, a length of 280 nm, and a thickness of 80 nm. The thickness of the ITO (or other TCO) layer (505) is, in this example, 5 nm, while the thickness of the gate dielectric HAOL is 20 nm, and the thickness of the metasurface antenna is 80 nm. In other embodiments, other dimensions may be used instead of the above numerical examples. In some embodiments, the dimensions of elements in FIG. 5 is in the nanometer range, e.g. between 1 and 900 nm. The dielectric layer (515) can be either thinner or thicker than the top antennas (510), depending on what kind of the materials is used for designing the gate dielectric and the antenna. In some embodiments, the thickness of the reflector (520) has to be thicker than 100 nm. In the example of FIG. 5, the thickness of reflector (520) is 150 nm.

Figure 6:
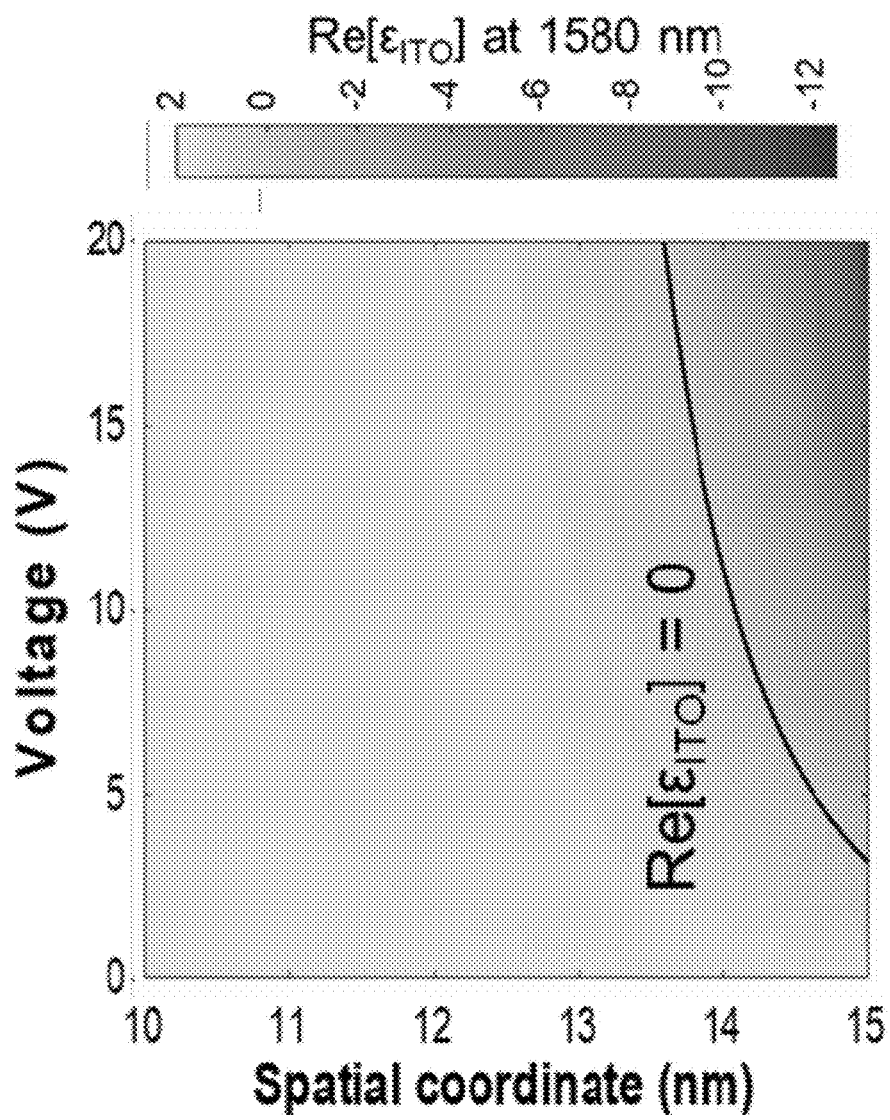
FIG. 6 illustrates a varying refractive index graph.

FIG. 6 illustrates an example of how the TCO of FIG. 1 can have a varying refractive index. In FIG. 6, the index values are for ITO, however the same principle can be applied to TCO. As the voltage is varied, the refractive index of the material changes, as a function of the spatial coordinate in the direction of varying depth of the layer. In other words, the spatial coordinate in the graph of FIG. 6 refers to the thickness of the layer.

In some embodiments, the metasurface device can be referred to as a dynamic polarization converter, with a tailored refractive index for the active layer. For example, FIG. 2 illustrates several exemplary polarization states (220). In some embodiments, the metasurfaces can comprise rotated rod, V-shaped or L-shaped antennas. In some embodiments, the amplitude and phase difference between orthogonal states are fixed while fabricating the structures. However, introducing an active index change layer into the metasurface device allows active control of the metasurface. It becomes therefore possible to actively control the amplitude and phase responses of the light scattered by the metasurface, with different electric components, for realizing different polarization states. In some embodiments, the metasurfaces can incorporate a plasmonic modulator (PlasMOStor), such as a metal-oxide Si field effect plasmonic modulator. For example, the metallic antenna (510) of FIG. 5 can be replaced with high index semiconductor materials, such as Si. The structure can then be regarded as a metal-oxide Si field effect plasmonic modulator for phase and amplitude modulations. A plasmonic modulator is described, for example, in Ref [1].

In some embodiments, it possible to cascade two or more metasurfaces and introduce index change materials between the cascaded metasurfaces, or integrating such material into both metasurfaces. Each metasurface may then act as a polarization filter. For example, the first metasurface may transmit only x-polarized light, while the second metasurface may transmit only y-polarized light. Upon external (e.g. electrical) actuation, the polarization of the incoming light can be modified, rendering the device partially or completely transparent to incoming light.

Modulation of the refractive index of active index change materials can be achieved by: applying an electric field, applying a magnetic field, adding or removing heat (temperature control), optical pumping, micro and nano electromechanical deformation, actuation or modulation. For example, to apply optical pumping, it is possible to an external laser pulse into the optical system for injecting free carrier into the active index-change materials. In these embodiments, the refractive index of the active materials is controlled by changing the carrier density via optical pumping. It is also possible to tune the refractive index by using micro and nanoelectromechanical deformation, which can be realized by incorporating metasurfaces with properly arranged electrical contacts and movable actuator. In some embodiments, the antenna of FIG. 5 is an element with a square area. These elements can be combined in an array to form a metasurface. Therefore, the shape of FIG. 1 panel b can constitute a unit which is repeated to form a metasurface array. While the shapes of FIG. 1 are described as two dimensional, the person of ordinary skill in the art will understand that such shapes also have a thickness, as can be seen for example in FIGS. 1 and 5. Therefore, shape (125) is described as having a rectangular cross section, while the full element is a parallelepiped.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

[1] Lee et al., *Nano Letters* 14, 6463-6468 (2014)
[2] Saenrang et al., Nature Communications 8, 17 (2017)
[3] Arbabi et al., Nature Communications 9, 812 (2018)
[4] She et al., Science Advances 4, eaap9957, (2018)

What is claimed is:

1. A structure comprising:
   a first electrode transparent to incident electromagnetic radiation;
   a second electrode;
   a dielectric layer disposed between the first electrode and the second electrode; and
   an array of elements on a surface of the first electrode opposite to the dielectric layer,
   wherein upon application of a control signal to the array of elements, the first electrode is configured to change its refractive index to have at least one first region of the first electrode having a refractive index higher than at least one second region of the first electrode.

2. The structure of claim 1, wherein the first electrode is a transparent conductive oxide.

3. The structure of claim 1, wherein the control signal is a voltage applied between the array of elements and the second electrode, or a temperature gradient applied across the first electrode.

4. The structure of claim 1, wherein the second electrode is a metallic reflector, and the structure is configured to reflect the incident electromagnetic radiation.

5. The structure of claim 1, wherein the first electrode is selected from the group consisting of: ITO, $Al_2O_3$, $MgF_2$, $HfO_2$, MgO, and $SiO_2$.

6. The structure of claim 1, wherein each element of the array of elements has a shape selected from the group consisting of: a rectangle, a cross, an L-shape, and a V-shape.

7. The structure of claim 1, wherein each element of the array of elements has a shape which is asymmetric with respect to a direction of an electric field of the incident electromagnetic radiation.

8. The structure of claim 1, wherein the at least one first region has a thickness of 1 nm.

9. The structure of claim 1, wherein the at least one first region has a higher free charge carrier density than the at least one second region.

10. The structure of claim 1, wherein the application of the control signal is configured to change coupling between eigenmodes supported by the structure, thereby controlling amplitude, phase and polarization of light reflected or transmitted by the structure.

11. The structure of claim 1, wherein the dielectric layer is selected from the group consisting of: Si, a III-V semiconductor, ITO, AZO, GZO, TiN, ZrN, HfN, TaN, $MoS_2$, $WSe_2$, a liquid crystal, a phase change material, and black phosphorus.

12. The structure of claim 11, wherein the III-V semiconductor is GaAs, InP, or GaP.

13. The structure of claim 1, wherein the dielectric layer is a nanolaminate.

14. The structure of claim 13, wherein the nanolaminate is HAOL.

15. The structure of claim 11, wherein the phase change material is $VO_2$ or GeSbTe.

16. The structure of claim 1, wherein:
   the incident electromagnetic radiation is linearly polarized in a first direction,
   the control signal is a voltage applied between the array of elements and the second electrode, and
   the structure is configured to reflect electromagnetic radiation which is:
      for a first voltage range of the control signal, linearly polarized in a second direction perpendicular to the first direction;
      for a second voltage range of the control signal different from the first voltage range of the control signal, elliptically polarized; and
      for a third voltage range of the control signal different from the first and the second voltage ranges of the control signal, circularly polarized.

17. The structure of claim 16, wherein the first voltage range of the control signal is between −4 and 2 V, the second voltage range of the control signal is between 2 and 12 V, and the third voltage range of the control signal is between 12 and 16 V.

18. The structure of claim 1, wherein the first electrode has a thickness of 5 nm, the dielectric layer has a thickness of 20 nm, and each element of the array of elements is a parallelepiped having a thickness of 80 nm, a width of 230 nm, and a length of 280 nm.

19. The structure of claim 4, wherein the metallic reflector has a thickness of 150 nm.

* * * * *